United States Patent
Hanyu et al.

(10) Patent No.: US 10,695,988 B2
(45) Date of Patent: Jun. 30, 2020

(54) METHOD OF PRODUCING THREE-DIMENSIONAL SHAPED ARTICLE

(71) Applicant: CANON KABUSHIKI KAISHA, Tokyo (JP)

(72) Inventors: Yukio Hanyu, Isehara (JP); Akira Sugiyama, Yokohama (JP); Naotake Sato, Yokohama (JP); Tatsuya Tada, Yokohama (JP); Satoru Yamanaka, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/453,786

(22) Filed: Jun. 26, 2019

(65) Prior Publication Data
US 2019/0315052 A1   Oct. 17, 2019

Related U.S. Application Data

(63) Continuation of application No. 15/123,720, filed as application No. PCT/JP2015/056764 on Mar. 3, 2015, now abandoned.

(30) Foreign Application Priority Data

Mar. 7, 2014 (JP) ................. 2014-045622
Mar. 7, 2014 (JP) ................. 2014-045623

(51) Int. Cl.
| | | |
|---|---|---|
| *B29C 64/141* | (2017.01) | |
| *B29C 67/00* | (2017.01) | |
| *G03G 15/22* | (2006.01) | |
| *B29C 64/165* | (2017.01) | |
| *B29C 64/40* | (2017.01) | |
| *B33Y 10/00* | (2015.01) | |
| *B29K 105/00* | (2006.01) | |

(52) U.S. Cl.
CPC ........ *B29C 67/0081* (2013.01); *B29C 64/141* (2017.08); *B29C 64/165* (2017.08); *B29C 64/40* (2017.08); *B33Y 10/00* (2014.12); *G03G 15/22* (2013.01); *G03G 15/224* (2013.01); *B29K 2105/251* (2013.01); *B29K 2995/0062* (2013.01)

(58) Field of Classification Search
CPC .................................................. B29C 64/141
See application file for complete search history.

(56) References Cited

U.S. PATENT DOCUMENTS

| | | | | |
|---|---|---|---|---|
| 5,593,531 A | * | 1/1997 | Penn .................... | G03G 15/221 156/272.6 |
| 2003/0006534 A1 | * | 1/2003 | Taboas ................ | A61F 2/30756 264/401 |
| 2004/0224173 A1 | * | 11/2004 | Boyd ........................ | C08J 5/18 428/500 |

* cited by examiner

*Primary Examiner* — Daniel H Lee
(74) *Attorney, Agent, or Firm* — Canon U.S.A., Inc. IP Division

(57) ABSTRACT

A method of producing a three-dimensional shaped article includes a step of forming particle layers by arranging particles containing a material for forming a shaped article and particles containing a material having higher solubility in fluid than the material for forming the shaped article, a step of forming a stack by melting and stacking the particle layers, and a step of removing the material having higher solubility in the fluid than the material for forming the shaped article from the stack by dissolving the material having higher solubility in the fluid than the material for forming the shaped article in the fluid.

10 Claims, 7 Drawing Sheets

METHOD OF PRODUCING THREE-DIMENSIONAL SHAPED ARTICLE

CROSS-REFERENCE TO RELATED APPLICATIONS

This application is a continuation of U.S. application Ser. No. 15/123,720, filed Sep. 6, 2016, which is a National Stage filing of International Application No. PCT/JP2015/056764 filed Mar. 3, 2015, which claims the benefit of Japanese Patent Application No. 2014-045623, filed Mar. 7, 2014, and Japanese Patent Application No. 2014-045622, filed Mar. 7, 2014, which are hereby incorporated by reference herein in their entirety

TECHNICAL FIELD

The present invention relates to a method of producing a three-dimensional shaped article.

BACKGROUND ART

Patent Literature 1 discloses a three-dimensional shaping method in which slice images made of resin particles are formed by electrophotography and are stacked. In Patent Literature 1, resin particles with a melting point lower than that of a material for forming a shaped article are used to form a support portion of a stack under construction and the support portion is removed in such a manner that the support portion is selectively melted by taking advantage of the difference in melting point between the support portion and the shaped article.

Patent Literature 2 discloses that poly(2-ethyl-2-oxazoline), which is a water-soluble material, is used to form a support portion.

CITATION LIST

Patent Literature

PTL 1 Japanese Patent Laid-Open No. 2003-53849
PTL 2 Japanese Patent No. 4301733

SUMMARY OF INVENTION

Technical Problem

However, in Patent Literature 1, the difference in melting point between the material for forming the shaped article and a material for forming the support portion needs to be large and therefore the degree of freedom in selecting a material that can be used to form an article is low. Furthermore, since the support portion is made of a low-melting point material, there is a problem in that the support portion is softened by heating during stacking and therefore the supporting function thereof is reduced.

In Patent Literature 2, a material for forming the support portion is rapidly melted in an extruder and is extruded into fibers, which are stacked such that an article is formed. Therefore, in the case of using a material with high moisture content, this material foams and cannot be stably extruded. Thus, the material for forming the support portion needs to be a water-soluble material with low moisture content.

Solution to Problem

The present invention provides a method of producing a three-dimensional shaped article. The method includes a step of forming particle layers by arranging particles containing a material for forming a shaped article and particles containing a material having higher solubility in fluid than the material for forming the shaped article, a step of forming a stack by melting and stacking the particle layers, and a step of removing the material having higher solubility in the fluid than the material for forming the shaped article from the stack by dissolving the material having higher solubility in the fluid than the material for forming the shaped article in the fluid.

Further features of the present invention will become apparent from the following description of exemplary embodiments with reference to the attached drawings.

DESCRIPTION OF EMBODIMENTS

Figure 1:
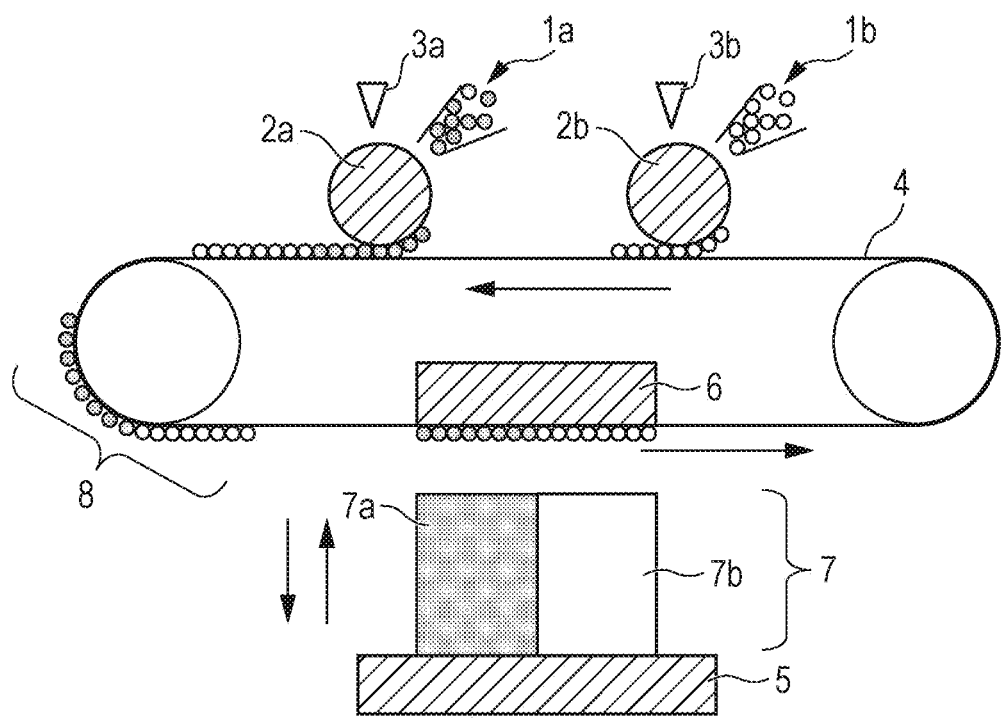
FIG. 1 is an apparatus of producing a three-dimensional shaped article according to an embodiment of the present invention.

Preferred embodiments of the present invention will now be described in detail with reference to the attached drawings.

A method of producing a three-dimensional shaped article according to an embodiment of the present invention includes the following steps:

(1) a step of forming particle layers by arranging particles containing a material for forming a shaped article and particles containing a material having higher solubility in fluid than the material for forming the shaped article, (2) a step of forming a stack by melting and stacking the particle layers, and (3) a step of removing the material having higher solubility in the fluid than the material for forming the shaped article from the stack by dissolving the material having higher solubility in the fluid than the material for forming the shaped article in the fluid.

These steps are described below with reference to FIG. 1.

Each step described below is an example of a step of the method of producing the three-dimensional shaped article. The present invention is not limited to the step.

((1) Step of Forming Particle Layers by Arranging Particles Containing Material for Forming Shaped Article and Particles Containing Material Having Higher Solubility in Fluid than Material for Forming Shaped Article)

A laser beam 3a is scanned across the curved surface of an electrophotographic photosensitive drum 2a and a laser beam 3b is scanned across the curved surface of an electrophotographic photosensitive drum 2b, whereby each of latent images is formed on a corresponding one of the electrophotographic photosensitive drums 2a and 2b.

The particles containing the material for forming the shaped article are supplied from a supply section 1a to the electrophotographic photosensitive drum 2a and are arranged depending on the latent image formed on the electrophotographic photosensitive drum 2a. The particles containing the material having higher solubility in the fluid than the material for forming the shaped article are supplied from a supply section 1b to the electrophotographic photosensitive drum 2b and are arranged depending on the latent image formed on the electrophotographic photosensitive drum 2b. The terms "material for forming the shaped article" and "solubility in the fluid" are hereinafter simply referred to as "article material" and "solubility", respectively.

The particles, arranged on the electrophotographic photosensitive drum 2a, containing the article material and the particles, arranged on the electrophotographic photosensitive drum 2b, containing the material having higher solubility than the article material are electrostatically transferred to a transfer belt 4, whereby particle layers 8 are formed so as to contain the particles containing the article material and the particles containing the material having higher solubility than the article material.

Examples of the article material include polyethylene (PE), polypropylene (PP), acrylonitrile-butadiene-styrene (ABS) copolymers, nylon 12, nylon 6, nylon 66, polyoxymethylene (POM), polycarbonate (PC), acrylic resins such as polymethyl methacrylate (PMMA), cyclic olefin copolymers (COCs), polyethylene terephthalate (PET), polybutylene terephthalate (PBT), and polyvinyl acetate (PVAc). Naturally, the article material is not limited to these exemplified materials and may be appropriately selected depending on purposes.

The particles containing the article material may be made of the article material only and may further contain a material such as a dispersant in addition to the article material. The article material may be a main component of the particles containing the article material. The term "main component of particles" as used herein refers to a component that accounts for 90% by weight or more of each particle.

The article material may be made of a single ingredient or may be made by mixing two or more ingredients. When the article material is a mixture of two or more ingredients, characteristics of the particles containing the article material, particularly, for example, the dynamic viscoelasticity thereof can be adjusted.

A method of preparing the particles containing the article material may be any known process.

Examples of the method of preparing the particles containing the article material include a mechanical crushing method, a melt dispersion cooling method in which particles are obtained in such a manner that the molten article material is dispersed in a medium and is then cooled, a chemical polymerization method such as a suspension polymerization method in which polymer particles are prepared in a medium, and a spray drying method in which particles are obtained in such a manner that a solution prepared by dissolving the article material in a solvent is sprayed and is rapidly dried. In particular, the melt dispersion cooling method, the chemical polymerization method, and the spray drying method are preferred because the shape and size distribution of particles can be relatively freely controlled.

When the size of particles used for shaping is large, the shaping time can be reduced. When the particle size is small, the shaping accuracy can be increased. The average size of particles preferred in the present invention preferably ranges from 5 µm to 100 µm, more preferably 10 µm to 70 µm, and further more preferably 20 µm to 50 µm depending on the accuracy required of the shaped article or the shaping time of the shaped article. The term "average size of particles" as used herein refers to the volume-average size of particles that is determined by a laser diffraction/scattering method.

The material having higher solubility than the article material is provided in a portion for forming a cavity of the shaped article or under an overhanging portion thereof in Steps (1) and (2), is dissolved in the fluid, and is thereby removed in Step (3). That is, the material having higher solubility than the article material forms the stack, which is obtained through Steps (1) and (2), and, however, does not form the shaped article, which is obtained through Step (3). A role required of the material having higher solubility than the article material is to support the article material provided on the portion for forming the cavity of the shaped article or provided in an overhanging pattern in Steps (1) and (2) and is to be quickly removed in Step (3).

A portion that is dissolved in the fluid and is thereby removed in Step (3) and the particles containing the material having higher solubility than the article material are hereinafter referred to as the support portion and the support material particles, respectively. Incidentally, particles described herein are not limited to a spherical shape and may have a spherical shape, a prismatic shape, a cylindrical shape, an oval shape, or an amorphous shape which is a mixture of some of these shapes that are deformed. In general, particles prepared by crushing are likely to have an amorphous shape and particles prepared by a melt dispersion cooling method, a chemical polymerization method, a spray drying method, or the like using a medium are readily controlled to have a spherical shape or a certain shape due to a crystal shape.

The solubility parameter of the particles containing the material having higher solubility than the article material is preferably 2 $(MPa)^{1/2}$ or more and more preferably 15 $(MPa)^{1/2}$ or more closer to the solubility parameter of the fluid than the solubility parameter of the particles containing the article material. This allows the support portion, which is made of the particles containing the material having higher solubility than the article material, that is, the support material particles, to be selectively dissolved in Step (3).

The solubility parameter described herein is one calculated by Fedors' method, which is one of methods of determining the solubility parameter from the molecular structure. When the fluid is, for example, water, the solubility parameter of the fluid is 47.9 $(MPa)^{1/2}$. When the fluid is, for example, hexane, the solubility parameter of the fluid is 14.1 $(MPa)^{1/2}$.

The support material particles may be made of a single material or a mixture of two or more materials.

In particular, the support material particles may be made of the single material having higher solubility than the article material or two or more materials having higher solubility than the article material. Alternatively, the support material particles may be made of the material having higher solubility than the article material and a material having lower solubility than the article material.

When the support material particles are made of a mixture of two or more materials, the dynamic viscoelasticity of the support material particles can be adjusted close to the dynamic viscoelasticity of the particles containing the article material. In the case where the dynamic viscoelasticity of the support material particles and the dynamic viscoelasticity of the particles containing the article material can be adjusted close to each other, the molten article material deposited on a portion made of the support material particles can be supported in a less deformed state.

In the present invention, the solubility parameter of the support material particles can be determined by a method below. In the case where the support material particles are made of the material having higher solubility than the article material and the case where the support material particles are made of the material having higher solubility than the article material and the material having lower solubility than the article material, the solubility parameter of the material having higher solubility than the article material is regarded as the solubility parameter of the support material particles. In the case where the support material particles are made of the two or more materials having higher solubility than the article material, a value obtained by weight-averaging the solubility parameters of these materials on the basis of the contents of these materials is regarded as the solubility parameter of the support material particles.

In the case of using a liquid mainly containing water in Step (3), the support material particles preferably contain a material having higher water solubility than the article material. The term "liquid mainly containing water" as used herein refers to a liquid containing 95% or more water on a weight basis.

A water-soluble material that can be used as a material having higher solubility than the article material is preferably a compound containing a hydroxy group. Examples of the water-soluble material include water-soluble carbohydrates such as water-soluble dietary fibers, sugar, and water-soluble polymers. Examples of the dietary fibers include polydextrose and inulin. Examples of the sugar include sucrose, lactose, maltose, trehalulose, melezitose, stachyose, xylose, glucose, fructose, isomaltooligosaccharide, fructooligosaccharide, xylooligosaccharide, soy oligosaccharide, xylitol, sorbitol, mannitol, maltotetraose, maltitol, lactitol, and oligosaccharide alcohols. Examples of the water-soluble polymers include polyvinylpyrrolidone, polyalkylene oxides, and polyvinyl alcohol.

However, the material having higher solubility than the article material is not limited to the above materials.

((2) Step of Forming Stack by Melting and Stacking Particle Layers)

The particle layers 8 formed by transferring the particles containing the article material and the support material particles to the transfer belt 4 are moved to a stacking stage 5.

Thereafter, the particle layers 8 are melted with a heater 6. The particle layers 8 are transferred to and stacked on the elevated stacking stage 5 or a stack 7 placed on the stacking stage 5. The stack 7 is obtained by stacking the particle layers 8 several times and includes an article portion 7a formed by melting the particles containing the article material and a support portion 7b made of the particles containing the material having higher solubility than the article material.

A procedure in which the particle layers 8 are stacked after being melted is described herein. The particle layers 8 may be melted after being stacked or during stacking.

The particle layers 8 may be melted by heating or by the contact with a solution.

Referring to FIG. 1, a region of each particle layer 8 that contains the particles containing the article material is stacked on the article portion 7a after the particles containing the article material are melted, a region of the particle layer 8 that contains the support material particles is stacked on the support portion 7b.

However, the region of the particle layer 8 that contains the support material particles and the region of the particle layer 8 that contains the particles containing the article material may be stacked on the support portion 7b and the article portion 7a, respectively, depending on the shape of the shaped article.

The particle layers 8, which contain the particles containing the article material and the support material particles, are stacked by transfer. Step (2) is a step of stacking the particle layers 8 after melting. The particle layers 8 may be transferred by taking advantage of the stickiness of the molten particle layers 8 or may be electrostatically transferred.

Incidentally, stacking by transfer is exemplified herein. The particle layers 8 may be directly stacked on the article portion 7a and the support portion 7b without using transfer.

((3) Step of Removing Material Having Higher Solubility in Fluid than Article Material by Dissolving Material Having Higher Solubility in Fluid than Article Material in Fluid)

In Step (3), the material having higher solubility than the article material is removed from the stack 7, which is obtained in Step (2), by dissolving the material having higher solubility than the article material in the fluid. As a result, the support portion 7b can be removed from the stack 7. The fluid may be liquid or gas and is preferably liquid.

Any method capable of removing the material having higher solubility than the article material using the fluid may be used. As such a method, for example, a method of immersing the stack 7, which is obtained in Step (2), in the fluid filled in a vessel is cited.

In the case of removing the support portion 7b by placing the stack 7 in the fluid, a flow is preferably formed in the fluid by stirring. The fluid may be heated or ultrasonically vibrated such that the material having higher solubility than the article material is quickly removed.

EXAMPLES (Confirmation of Foamability of Particles Containing Material Having Higher Water Solubility than Article Material)

A material having higher water solubility than the article material may possibly be foamed during heating as disclosed in Patent Literature 2. Therefore, the foamability of the material was confirmed by actually melting the material by heating. Incidentally, a water-insoluble material is not foamed even if the water-insoluble material is melted by heating.

Particles obtained by mechanically crushing polydextrose with a moisture content of 4% were classified with a sieve classifier, whereby polydextrose particles with an average size of 25 μm, polydextrose particles with an average size of 50 μm, and polydextrose particles with an average size of 100 μm were prepared. The polydextrose particles with an average size of 25 μm, the polydextrose particles with an average size of 50 μm, and the polydextrose particles with an average size of 100 μm were densely attached to polyimide sheets by electrostatic transfer. The polyimide sheets were heated to the softening point of polydextrose, that is, 140° C. using a hotplate and were observed for condition.

Foaming could not be visually confirmed from the polydextrose particles with an average size of 25 μm, 50, μm, or 100 μm. This is probably because these polydextrose particles were small particles with an average size of 100 μm or less and therefore moisture contained in polydextrose was smoothly removed from these polydextrose particles.

Next, the polydextrose particles with an average size of 50 μm were molded at 50° C. with a load of 20 kg using a tableting machine, whereby a pellet having a diameter of 1 cm and a thickness of 1 mm was prepared. The obtained pellet was heated to the softening point of polydextrose, that is, 140° C. using a hotplate and was observed for condition. As a result, vigorous foaming was observed together with softening. This confirmed that when the size of the heated material having higher water solubility than the article material is 100 μm or less, foaming caused by the evaporation of moisture contained in the material having higher water solubility than the article material can be reduced to a non-problematic level.

Example 1

In this example, a three-dimensional shaped article was prepared using particles of a cyclic olefin copolymer (COC) as particles containing an article material, a liquid mainly containing water as fluid for removing a support portion, and particles of polydextrose as support material particles.

Figure 5A:
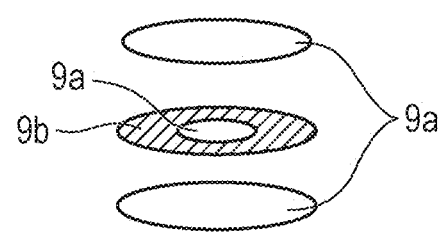
FIG. 5A is an illustration of particle layers formed during shaping.
Figure 5B:
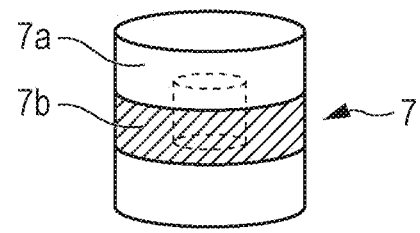
FIG. 5B is an illustration of a stack obtained by stacking the particle layers shown in FIG. 5A.
Figure 5C:
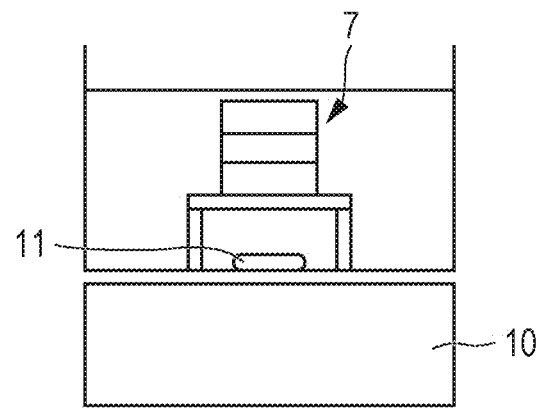
FIG. 5C is an illustration of an apparatus (support portion-removing apparatus) used to remove a support portion from the stack shown in FIG. 5B.
Figure 5D:
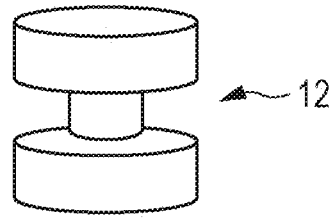
FIG. 5D is an illustration of a three-dimensional shaped article obtained by removing the support portion from the stack shown in FIG. 5B.

The three-dimensional shaped article, which was prepared in this example, had a shape shown in FIG. 5D. In particular, the three-dimensional shaped article had a shape formed by stacking a cylinder having a diameter of 3 cm and a height of 1 cm, a cylinder having a diameter of 1 cm and a height of 1 cm, and a cylinder having a diameter of 3 cm and a height of 1 cm.

The COC and polydextrose were mechanically crushed. Obtained particles of the COC and obtained particles of polydextrose were adjusted with a sieve classifier so as to have an average size of 50 μm.

Figure 2A:
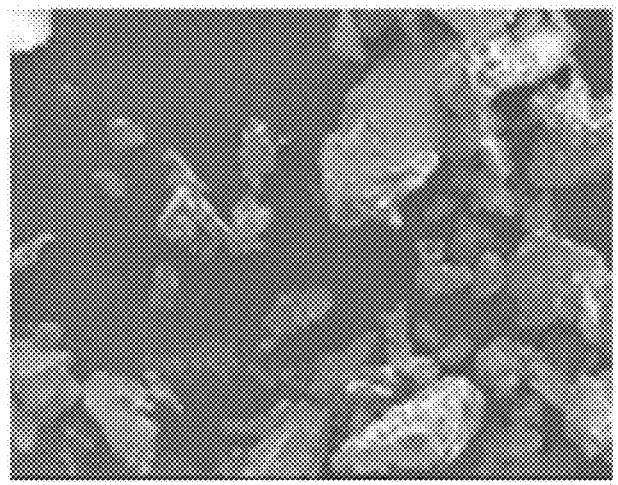
FIG. 2A is a scanning electron microscope (SEM) photograph of polydextrose particles prepared in Example 1.

The COC particles and the polydextrose particles were measured for average size by a laser diffraction/scattering method, resulting in that the COC particles and the polydextrose particles had an average size of 50 μm. FIG. 2A shows a SEM photograph of the polydextrose particles.

Figure 4:
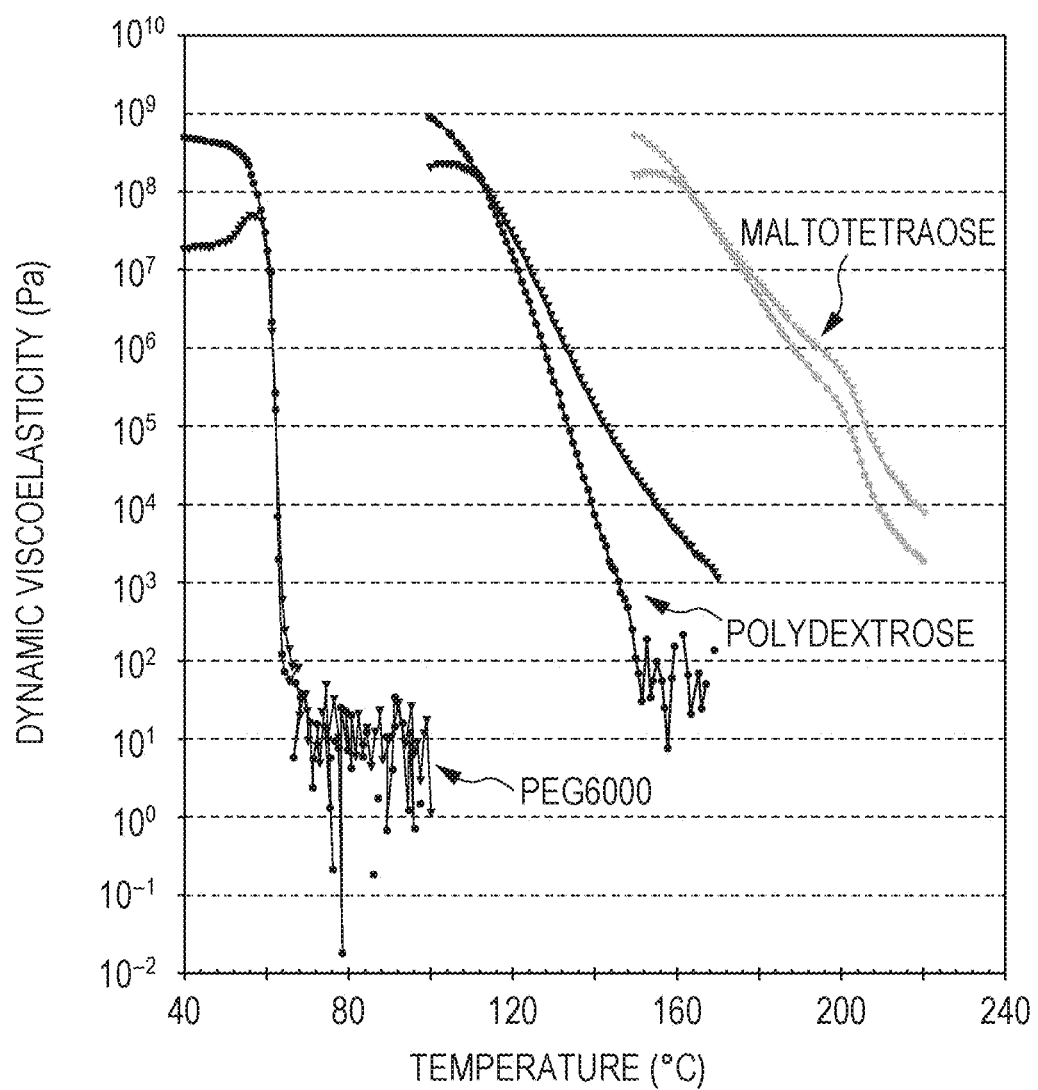
FIG. 4 is a graph showing the dynamic viscoelasticity of the polydextrose particles prepared in Example 1, the dynamic viscoelasticity of the maltotetraose particles prepared in Example 2, and the dynamic viscoelasticity of the PEG 6000 particles prepared in Example 4.

Next, the temperature dependence of dynamic viscoelasticity of the polydextrose particles was measured within a temperature range of 100° C. to 180° C. using a rheometer, MCR 302, available from Anton Paar. The measurement results are shown in FIG. 4.

Particle layers were formed from the COC particles and the polydextrose particles using a shaping apparatus shown in FIG. 1. One of the particle layer was melted, was solidified, and was then measured for thickness, resulting in that this particle layer had a thickness of 30 μm.

At a stack temperature of 120° C., 1,000 of the particle layers were stacked in total. The term "stack temperature" as used herein refers to the temperature of a stack surface of a transfer belt, the stack surface being located directly under a heater.

In order to form a cylindrical section having a diameter of 3 cm and a height of 1 cm in an early part of a step and a cylindrical section having a diameter of 3 cm and a height of 1 cm in a later part of the step, particle layers each including only a region 9a in which the COC particles were arranged were formed as shown in FIG. 5A. The number of the particle layers stacked to form each cylindrical section was 333. In order to form a cylindrical section having a diameter of 1 cm and a height of 1 cm, the cylindrical section being interposed between the cylindrical sections having a diameter of 3 cm and a height of 1 cm, particle layers each including the region 9a in which the COC particles were arranged and a region 9b in which the polydextrose particles were arranged were formed. The number of the particle layers stacked to form this cylindrical section was 334.

A stack 7 obtained by stacking these particle layers was immersed in the liquid mainly containing water, followed by removing polydextrose from the stack 7 using a support portion-removing apparatus shown in FIG. 5C. The support portion-removing apparatus included a magnetic stirring unit 10 and a stirrer 11 for magnetic stirring. A sample platen was net-shaped such that the stack 7 was uniformly contacted with the liquid mainly containing water, the liquid being stirred with the stirrer 11.

The liquid mainly containing water may be one prepared by mixing water with a pH adjuster or the like. In this case, the amount of the pH adjuster or the like is preferably 5% or less of water on a weight basis.

Figure 7:
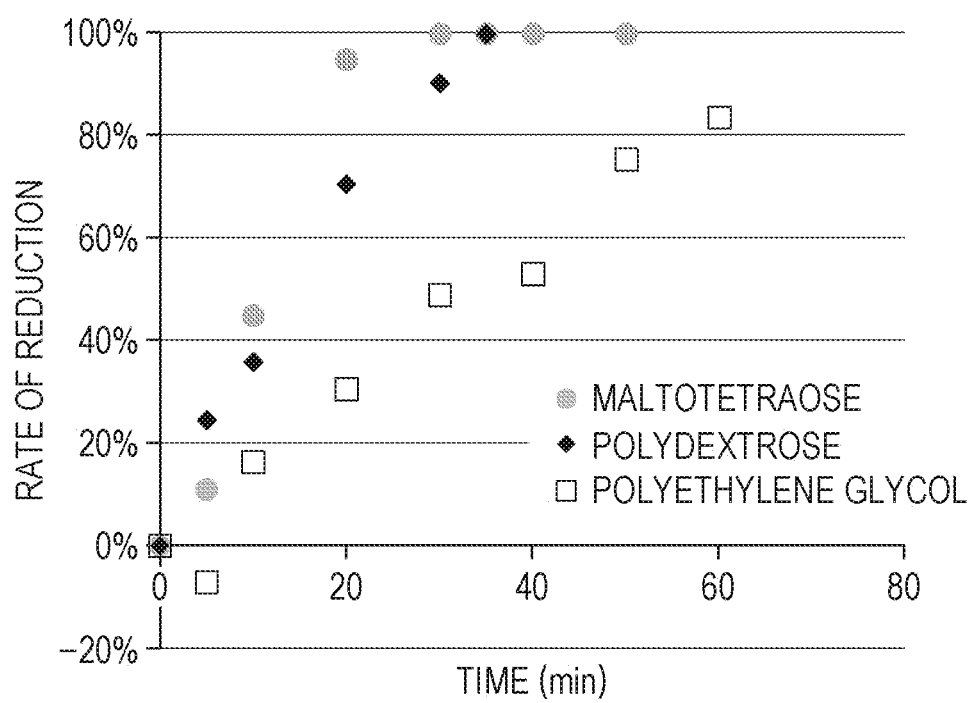
FIG. 7 is a graph showing the time taken to remove a support portion from a stack obtained in each of Examples 1, 2, and 4 depending on a material for forming support material particles.

The relationship between the time (removal time) taken to remove polydextrose making up the support portion and the rate of removal of polydextrose is shown by solid rhombuses in FIG. 7. Polydextrose could be removed within 40 minutes without leaving any residue. The obtained three-dimensional shaped article included an upper cylindrical section having a diameter of 3 cm and a height of 1 cm. An overhanging portion (a portion with no structural layer thereunder) of the upper cylindrical section was not deformed downward. No cavities or irregularities due to the foaming of material were observed in the surface of the three-dimensional shaped article. It was confirmed that the three-dimensional shaped article could be accurately prepared.

Example 2

In this example, a three-dimensional shaped article was prepared by a method similar to that described in Example 1 using particles of polypropylene as particles containing an article material, a liquid mainly containing water as fluid for removing a support portion, and particles of maltotetraose as support material particles.

The polypropylene particles were prepared by a melt dispersion cooling method. In particular, polypropylene, Noblen W-531, available from Sumitomo Chemical Co., Ltd. and a medium, that is, polyethylene glycol, PEG #20000, available from Sanyo Chemical Industries, Ltd. were mixed at a ratio of 1:6, were melted at a temperature of 200° C., and were kneaded, followed by cooling, washing with water, and drying, whereby the polypropylene particles were obtained. The polypropylene particles had an average size of 50 μm.

After being mechanically crushed, the maltotetraose particles were adjusted with a sieve classifier so as to have an average size of 50 μm.

Figure 2B:
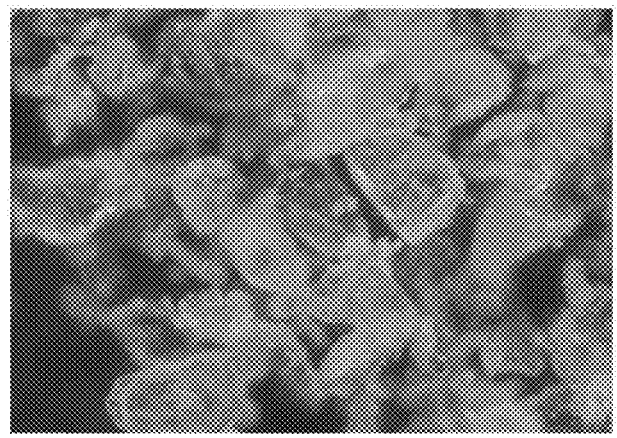
FIG. 2B is a SEM photograph of maltotetraose particles prepared in Example 2.
Figure 3A:
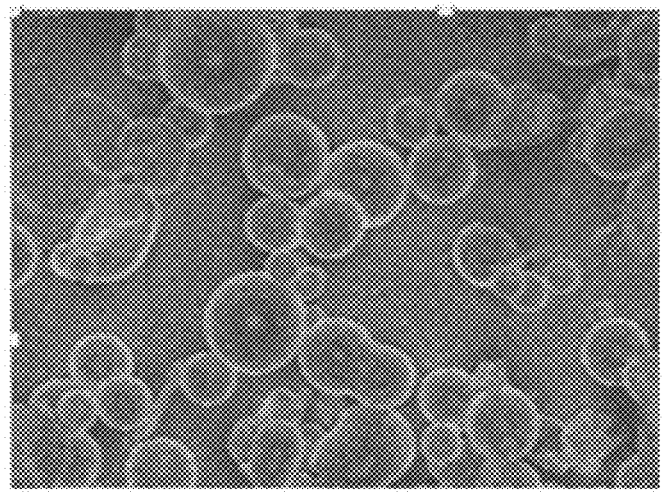
FIG. 3A is a SEM photograph of polypropylene particles prepared in Example 2.

FIG. 2B shows a SEM photograph of the maltotetraose particles. FIG. 3A shows a SEM photograph of the polypropylene particles.

The maltotetraose particles were measured for dynamic viscoelasticity at different temperatures. The measurement results are shown in FIG. 4.

Particle layers were prepared from the polypropylene particles and the maltotetraose particles using a shaping apparatus shown in FIG. 1. A stack was prepared by stacking 1,000 of the particle layers at a stack temperature of 130° C. The stack was immersed in the liquid mainly containing water as described in Example 1, whereby a support portion was removed from the stack. The relationship between the time taken to remove maltotetraose and the rate of removal of maltotetraose is shown by gray circles in FIG. 7. Maltotetraose could be removed within 30 minutes without leaving any residue. An overhanging portion of the three-dimensional shaped article was not deformed downward as described in Example 1. No cavities or irregularities due to the foaming of material were observed in the surface of the three-dimensional shaped article. It was confirmed that the three-dimensional shaped article could be accurately prepared.

Example 3

In this example, a three-dimensional shaped article was prepared by a method similar to that described in Example 1 using particles of acrylonitrile-butadiene-styrene (ABS) as particles containing an article material and particles of a mixture of maltotetraose and polydextrose as particles containing a material having higher solubility than the article material.

ABS, Techno ABS 130, available from Techno Polymer Co., Ltd. and a medium, that is, polyethylene glycol, PEG #20000, available from Sanyo Chemical Industries, Ltd. were mixed at a ratio of 1:4, were melted at a temperature of 250° C., and were kneaded, followed by cooling, washing with water, and drying, whereby the ABS particles were obtained. The ABS particles had an average size of 50 μm.

Figure 3B:
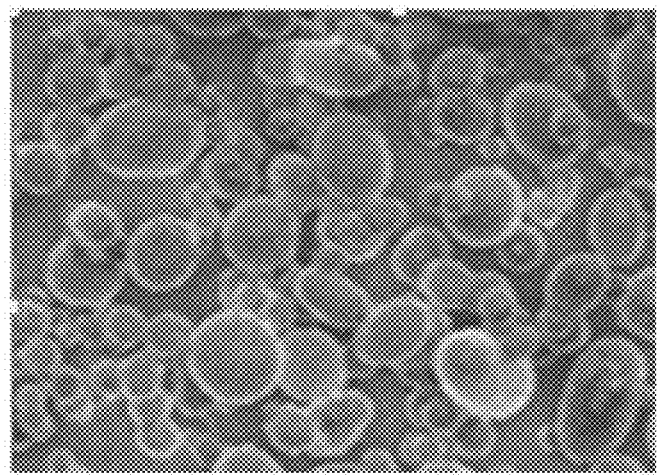
FIG. 3B is a SEM photograph of ABS particles prepared in Example 3.

FIG. 3B shows a SEM photograph of the ABS particles.

The particles of the maltotetraose-polydextrose mixture were prepared by a spray drying method. In particular, the polydextrose particles prepared in Example 1 and the maltotetraose particles prepared in Example 2 were dissolved in water, whereby a solution was prepared. The solution was dried in such a manner that the solution was sprayed in a high-temperature atmosphere, whereby the particles of the maltotetraose-polydextrose mixture were obtained.

Figure 6:
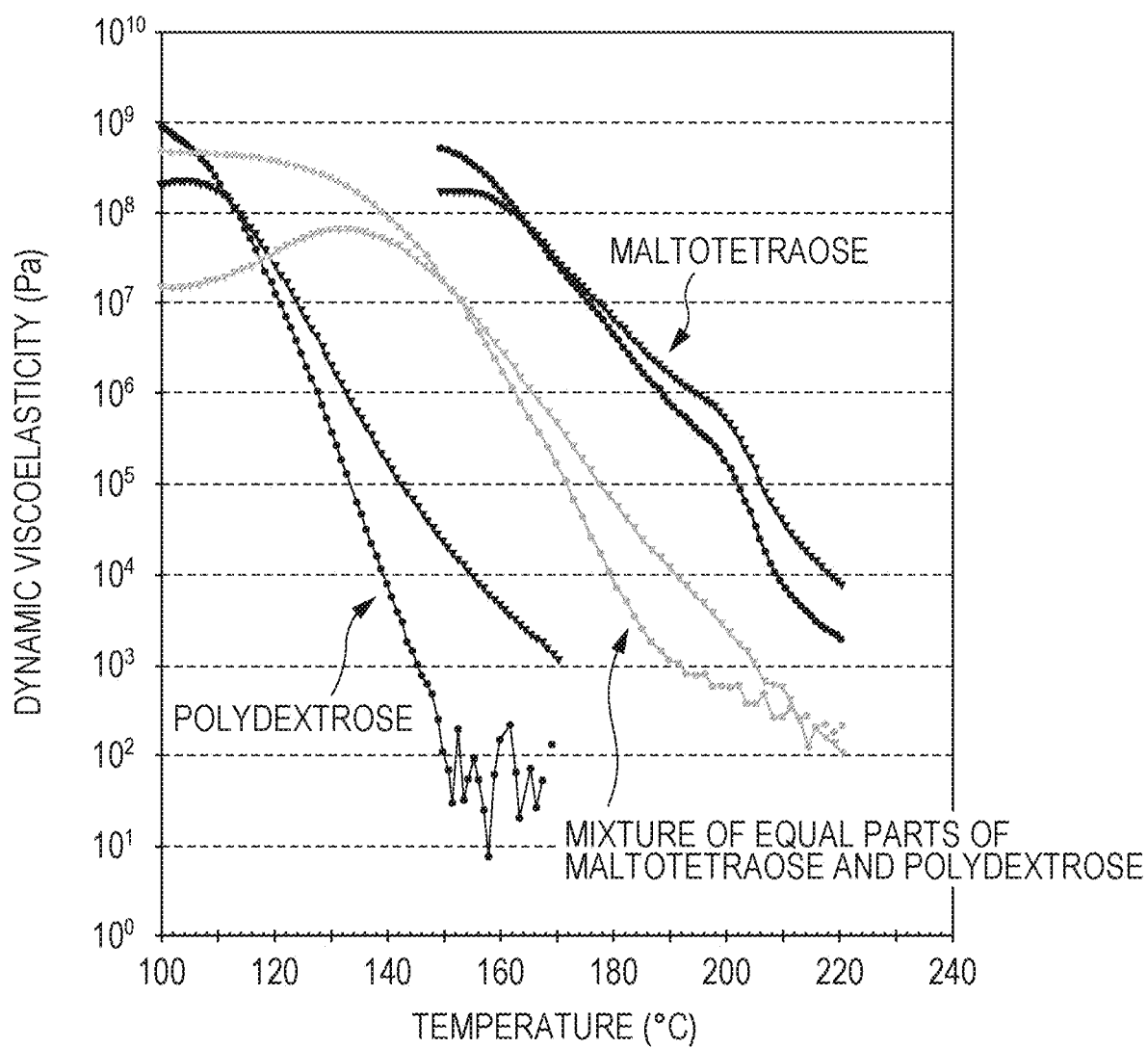
FIG. 6 is a graph showing the dynamic viscoelasticity of the polydextrose particles prepared in Example 1, the dynamic viscoelasticity of the maltotetraose particles prepared in Example 2, and the dynamic viscoelasticity of particles of a mixture of polydextrose and maltotetraose, the particles being prepared in Example 3.

The particles of the maltotetraose-polydextrose mixture were measured for dynamic viscoelasticity at different temperatures. The measurement results are shown in FIG. 6 together with the dynamic viscoelasticity of the polydextrose particles prepared in Example 1 and the dynamic viscoelasticity of the maltotetraose particles prepared in Example 2. As is clear from FIG. 6, the relationship between the temperature and dynamic viscoelasticity of particles of a mixture of equal parts of maltotetraose and polydextrose is different from that of the polydextrose particles and that of the maltotetraose particles. That is, desired dynamic viscoelasticity can be adjusted at a desired temperature by mixing polydextrose and maltotetraose.

Particle layers were formed from the ABS particles and the particles of the maltotetraose-polydextrose mixture in a manner shown in FIG. 5A. At a stack temperature of 140° C., 1,000 of the particle layers were stacked, whereby a structure was obtained. The structure was immersed in water and maltotetraose and polydextrose were removed from the structure using a support portion-removing apparatus shown in FIG. 5C as described in Example 1. A support portion made of maltotetraose and polydextrose could be removed within 30 minutes without leaving any residue. An overhanging portion of the three-dimensional shaped article was not deformed downward as described in Example 1. No cavities or irregularities due to the foaming of material were observed in the surface of the three-dimensional shaped article. It was confirmed that the three-dimensional shaped article could be accurately prepared.

Example 4

In this example, a three-dimensional shaped article was prepared using particles of Lubriwax 103 available from Freund Corporation as particles containing an article material, a liquid mainly containing water as fluid for removing a support portion, and particles of polyethylene glycol as particles having higher water solubility than the particles containing the article material. A method similar to that described in Example 1 was used to prepare the three-dimensional shaped article.

The Lubriwax 103 particles had an average size of 69 nm.

Figure 2C:
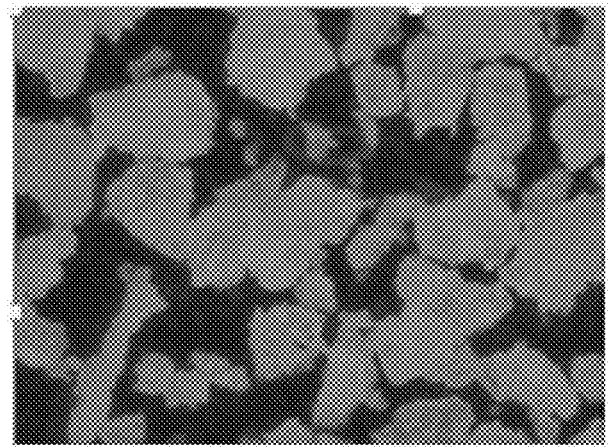
FIG. 2C is a SEM photograph of PEG 6000 particles prepared in Example 4.

The polyethylene glycol particles were obtained in such a manner that polyethylene glycol, PEG 6000, having an average molecular weight of 6,000 was mechanically crushed and obtained particles of the polyethylene glycol were adjusted with a sieve classifier so as to have an average size of 70 μm. FIG. 2C shows a SEM photograph of the polyethylene glycol particles.

Furthermore, the polyethylene glycol particles were measured for dynamic viscoelasticity at different temperatures. The measurement results are shown in FIG. 4.

Particle layers were formed from the Lubriwax 103 particles and the polyethylene glycol particles in a manner shown in FIG. 5A using a shaping apparatus shown in FIG. 1. One of the particle layers was melted, was solidified, and was then measured for thickness, resulting in that this particle layer had a thickness of 42 μm. At a stack temperature of 69° C., 1,000 of the particle layers were stacked in total, whereby a stack was prepared. The stack was immersed in the liquid mainly containing water and polyethylene glycol was removed from the stack using a support portion-removing apparatus shown in FIG. 5C. The relationship between the time taken to remove polyethylene glycol and the rate of removal of polyethylene glycol is shown by open squares in FIG. 7. A support portion made of polyethylene glycol could be removed within 30 minutes without leaving any residue. An overhanging portion was not deformed downward as described in Example 1. It was confirmed that the particle layers could be accurately stacked.

Example 5

In this example, a three-dimensional shaped article shown in FIG. 5D was prepared in substantially the same manner as that described in Example 3 except that the average size of particles containing an article material and the average size of support material particles were adjusted to 25 μm.

Particle layers were formed from the particles containing the article material and the support material particles in a manner shown in FIG. 5A using a shaping apparatus shown in FIG. 1. One of the particle layers was melted, was solidified, and was then measured for thickness, resulting in that this particle layer had a thickness of 15 μm. At a stack temperature of 140° C., 714 of the particle layers were stacked in total, whereby a stack was prepared. The stack was immersed in water as described in Example 3, whereby a support portion made of maltotetraose and polydextrose was removed from the stack. The support portion made of maltotetraose and polydextrose could be removed within 30 minutes without leaving any residue. An overhanging portion of the three-dimensional shaped article was not deformed downward as described in Example 1. No cavities or irregularities due to the foaming of material were observed in the surface of the three-dimensional shaped article. It was confirmed that the three-dimensional shaped article could be accurately prepared.

Example 6

In this example, a three-dimensional shaped article was prepared using particles of PEG as particles containing an article material, hexane as fluid for removing a support portion, and particles of Lubriwax 103 available from Freund Corporation as support material particles.

After being mechanically crushed, the PEG particles were adjusted with a sieve classifier so as to have an average size of 70 μm. The Lubriwax 103 particles had an average size of 69 μm.

Particle layers were formed from the PEG particles and the Lubriwax 103 particles in a manner shown in FIG. 5A using a shaping apparatus shown in FIG. 1. One of the particle layers was melted, was solidified, and was then measured for thickness, resulting in that this particle layer had a thickness of 42 μm. At a stack temperature of 69° C., 714 of the particle layers were stacked in total, whereby a stack was prepared. The stack was immersed in hexane and a support portion made of Lubriwax 103 was removed from the stack using a support portion-removing apparatus shown in FIG. 5C. The support portion made of Lubriwax 103 could be removed within 30 minutes without leaving any residue. An overhanging portion of the three-dimensional shaped article was not deformed downward as described in Example 3. No cavities or irregularities due to the foaming of material were observed in the surface of the three-dimensional shaped article. It was confirmed that the three-dimensional shaped article could be accurately prepared.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method of producing a three-dimensional shaped article made of an article material, the method comprising:
   forming layers including a region made of the article material and a region made of a support material;
   forming a stack by melting and stacking the layers; and
   removing the region made of the support material from the stack,
   wherein the support material contains a first material having a dynamic viscoelasticity higher than a dynamic viscoelasticity of the article material and a second material having a dynamic viscoelasticity lower than the dynamic viscoelasticity of the article material, and
   wherein a difference between a dynamic viscoelasticity of the support material and the dynamic viscoelasticity of the article material is smaller than a difference between the dynamic viscoelasticity of the first material and the dynamic viscoelasticity of the article material and is smaller than a difference between the dynamic viscoelasticity of the second material and the dynamic viscoelasticity of the article material.

2. The method according to claim 1, wherein the region made of the support member is selectively removed from the stack with use of a liquid containing water.

3. The method according to claim 2, wherein at least one of the first material and the second material is a water-soluble material.

4. The method according to claim 3, wherein the water-soluble material is a compound containing a hydroxy group.

5. The method according to claim 3, wherein the water-soluble material is a water-soluble carbohydrate.

6. The method according to claim 2, wherein the article material is at least one of polypropylene, an acrylonitrile-butadiene-styrene copolymer, polymethyl methacrylate, and polyvinyl acetate.

7. The method according to claim 1, wherein a main component of the liquid containing water is water.

8. The method according to claim 1, wherein the article material and the support material are particles.

9. The method according to claim 8, wherein electrophotography is used for forming the layers including the region made of the article material and the region made of the support material.

10. The method according to claim 8, wherein an average particle size of the support material is 100 μm or less.

* * * * *